United States Patent Office 3,035,000
Patented May 15, 1962

3,035,000
CONDENSATION PRODUCTS OF AN EPOXIDIZED FATTY OIL AND AN ALKYLENE POLYAMINE
Richard W. Fulmer, Minneapolis, Minn., assignor to General Mills, Inc., a corporation of Delaware
No Drawing. Filed Mar. 17, 1960, Ser. No. 15,546
6 Claims. (Cl. 260—18)

This invention relates to the condensation products of an epoxidized fatty oil and a polyamine. The products are resinous materials which find utility as adhesives, in laminates, and potting and casting compounds. When a polycarboxylic acid such as adipic acid is also used in the reaction, products particularly suitable as metallic cements such as used in the bonding of seams of metallic containers, are provided. The products are also useful as coreactant agents for epoxy resins.

It is therefore an object of this invention to provide a novel condensation product of an epoxidized fatty oil and a polyamine.

It is also an object of this invention to provide a condensation product suitable as a metallic cement.

Other objects and advantages will be apparent from the following description of the invention.

The epoxidized fatty oils are prepared in the conventional manner by epoxidation of the fatty oils. The fatty oils are a cheap and readily available natural raw material source. In nature the oils exist as a complex mixture of glycerides of saturated and unsaturated fatty acids of varying chain lengths, frequently characterized as having from 8 to 22 carbon atoms. Illustrative of such fatty oils which may be epoxidized are soybean oil, tobacco seed oil, safflower oil, linseed oil, tung oil and the like.

One method of preparing the epoxidized fatty oils is to react any of the various fatty oils containing unsaturated fatty acid radicals with peracetic acid at room temperature. The peracetic acid may be preformed before the epoxidation step or may be formed in situ by any one of the well known processes involving sulfonic acid resins utilizing hydrogen peroxide and acetic acid. Epoxidation can also be accomplished by the use of formic acid and hydrogen peroxide. Another method of epoxidation is by the addition of hypochlorous acid to the carbon-carbon double bond followed by dehydrochlorination.

Epoxidized oils of any oxirane oxygen content may be employed in this invention. Maximum oxirane oxygen content is, of course, limited by the amount of unsaturation in the fatty materials which are epoxidized. In general, the materials used in this invention will have an oxirane oxygen content of from 0.5 to 7.5% oxirane oxygen content and preferably from 3.0 to about 7.0%. One advantage in the use of epoxidized oils over the epoxidized acids or alkyl esters is that the oils can be epoxidized to a high oxirane oxygen content, on the order of 6 to 7.5%, this providing greater reactivity and somewhat different properties in the final products.

The polyamines which may be employed for reaction with the epoxidized fatty oil are those having the formula $H_2N(RNH)_xH$ where R is an alkylene radical having from 1 to 8 carbon atoms and x is an integer from 1 to 6. Illustrative of such polyamines are ethylene diamine, diethylene triamine, triethylene tetramine, tetraethylene pentamine, di-1,2-propane triamine, di-1,3-propane triamine, hexamethylene diamine and the like. For convenience, the ethylene polyamines are generally used as these are readily available. However, the invention is not to be limited thereto, as the higher alkylene groups may be used. In addition there are some polyamines which have the basicity and reactivity of the alkylene polyamines but which have an aromatic radical therein. Illustrative of such polyamines are the xylylene diamines. In this type, although an aromatic nucleus is present, the amino groups are attached to the aromatic ring through an aliphatic hydrocarbon radical or alkylene radical, thus behaving as an aliphatic polyamine.

The amount of polyamine used may vary over a wide range. It is generally used in an amount to provide at least 1.0 amine equivalents per total functional equivalents (epoxy plus carboxy) of the epoxidized material. At this ratio 1.0 to 1.0, the products will have low amine numbers which are desirable when the product is used by itself as an adhesive, as for example, as a seam cement for metallic containers. At higher ratios, higher amine numbers will result which make the products suitable as curing agents for epoxy resins. Amine number is defined as the milligrams of potassium hydroxide equivalent to the amine groups in one gram of product. The products of the present invention will have amine numbers in the range of about 5 to about 700.

The reaction of the epoxidized material and the polyamine is generally carried out under the conventional amidification conditions which are about 100 to 300° C. It is however preferred to carry out the reaction at a temperature in excess of 150° C. in order to reduce the time of reaction, so that the preferred range of heating would be 150 to 300° C. The reaction at this preferred temperature is usually carried out for from 1 to 8 hours, generally 2 to 4 hours being sufficient. In the reaction glycerol is formed. It is not necessary to remove the glycerol and in the examples to follow, no attempt was made to remove it. The addition of a polycarboxylic acid results in reaction of the acid with the glycerol to form a combined polyamide-polyester.

As stated, in addition to the epoxidized oil and the polyamine, certain polycarboxylic acids may also be employed to modify the products of this invention. The addition of these polycarboxylic acids provides additional advantages particularly when the products are to be used as seam cements in containers. The polycarboxylic acids which may be employed are those fatty acids having at least two carboxyl groups which are separated by at least 3 and not more than 8 carbon atoms. Typical of such acids are aliphatic acids such as glutaric, adipic, pimelic, suberic, azelaic, and sebacic, and aromatic acids such as phthalic, terephthalic and isophthalic. Instead of the free acids the lower alkyl esters (those having from 1 to 5 carbon atoms) or the anhydrides may be used. In addition, the polycarboxylic acids may be dimerized or trimerized fatty acids such as dimerized and/or trimerized linoleic, linolenic, and other unsaturated fatty acids from the fatty oils previously mentioned. The presently available dimerized or trimerized acids are generally prepared from the $C_{18}$ unsaturated fatty acids or esters. These acids, when employed, will be used in an amount of from 0 to 40% by weight based on the amount of epoxidized oil. It is generally preferred that about 5 to 30% of these acids be used.

The invention can best by illustrated by means of the following examples.

*Example I*

To 200 gm. of epoxidized soybean oil (6.44% oxirane oxygen content; 0.805 eq. oxirane, 0.667 eq. ester) was added 134 grams of triethylene tetramine (.6 mole equivalent, 96.5% purity) and the reaction heated at 150 to 160° C. for three hours. Essentially no distillate was recovered. The product was a soft thermoplastic solid with an amine number of 468.

*Example II*

The same reaction of Example I was rerun and 25 gm. (0.33 eq.) of adipic acid was added after three hours. The reaction was heated an additional hour at 150° C.

The product was also a soft, solid resin with an amine number of 410.

Example III

A mixture of 100 gm. of epoxidized soybean oil (6.44% oxirane oxygen, 0.73 total eq.) and 32 gm. (0.425 mole/equivalent oxirane plus ester) of diethylene triamine was reacted as in Example I. Five gm. of adipic acid (0.068 eq. or 0.093 eq. per total eq. of epoxy oil) was added and the reaction continued for 30 minutes. The resulting soft solid resinous product exhibited a peel strength of 35 pounds per inch.

Example IV

To 200 gm. of epoxidized soybean oil (6.44% oxirane oxygen, 1.47 total equivalents) was added 106 gm. of diethylene triamine (0.7 mole per eq. of the epoxy oil) and the blend heated at 150 to 160° C. for two hours. No distillate was obtained. To this was added 58 gm. (0.3 mole, 0.6 eq.) of dimethyl terephthalate and the reaction continued at 160 to 200° C. for 3.5 hours, the last hour under moderate vacuum. The product was a brittle solid with a Dennis Parr melting point of 100 to 105° C.

Example V

In a reaction similar to Example IV, 200 gm. of epoxidized soybean oil (7.08% oxirane oxygen, 1.54 total equivalent) and 25 gm. (0.42 mole, or 0.54 mole/eq. of epoxy oil) of ethylene diamine were reacted at 140 to 150° C. for two hours. After addition of 30 gm. dimethyl terephthalate was added and methanol distillate collected as the reaction temperature was raised to 200° C. and maintained there for three hours, the last hour under moderate vacuum. The resulting mixed polymer was also a brittle solid with a ball and ring melting point of 69° C.

Example VI

To 300 grams epoxidized oil used in Example I was added 66 grams of ethylene diamine (1.0 eq./eq. of epoxy material) and the reaction carried out for two hours at 190° C. Twenty-four grams of $C_{54}$ trimer (trimerized $C_{18}$ fatty acids) were added and heating continued for five hours at 190° C., the last three hours under moderate vacuum. The product exhibited a peel strength of 56 pounds per inch.

Example VII

A reaction was carried out for seven hours at 180° C., using the same proportions of ethylene diamine and epoxidized oil as in Example VI without the addition of trimer. The product exhibited a peel strength of 35 pounds per inch. A second identical reaction was conducted with the subsequent addition of a maleic modified rosin acid and continued heating for two hours at 200 to 280° C. The product exhibited a peel strength of 59 pounds per inch.

It is apparent that a variety of products may be provided by the present invention suitable for a wide variety of purposes. The products having the high amine numbers are suitable as hardening agents for epoxy resins. The peel strength of the products is sufficiently high to indicate utility as a seam cement for metallic containers. The brittle solids of Examples IV and V would find utility as resin binders in printing inks. The addition of the polycarboxylic acids appears to provide products of increased peel strength, thus providing products more suitable for seam cements.

In determining the suitability of any cement the tear burst or peel strengths are ordinarily determined. High peel strengths ordinarily indicate desirable characteristics of such cements. By peel strength is meant the force required to separate two sheets bonded together with the adhesive. This force can be measured in a variety of ways. Two methods are commonly used, both of which utilize a conventional tester such as a Dillon tester. In one method two metallic sheets bonded at one end are pulled over ½″ diameter roll guides at a speed of one inch per minute. The roll guides are supported in a jig which is attached to one end of the tester. The other end of the tester is attached to the ends of the two sheets which lie over opposite roller guides. The method was used in Example III above. In the second method the two uncemented ends are drawn over a plurality of ½ inch ball bearing rollers suspended in the jig. These are also pulled at the rate of one inch per minute. This method was used in Examples VI and VII above.

The embodiments of the invention in which an exclusive property or privilege is claimed are defined as follows:

1. A condensation product of an epoxidized fatty oil and a polyamine having the formula $H_2N(RNH)_xH$ where R is an alkylene radical having from 1 to 8 carbon atoms and $x$ is an integer from 1 to 6, the condensation reaction being carried out at a temperature of 100 to 300° C.

2. A product as defined in claim 1 in which R is ethylene.

3. A product as defined in claim 1 in which said fatty oil is soybean oil.

4. A product as defined in claim 1 in which said polyamine is employed in an amount providing at least 1.0 amine equivalents per equivalent of epoxidized fatty oil.

5. A condensation product of (A) a polycarboxylic acid selected from the group of polymeric fat acids and non-fatty polycarboxylic acids in which the carboxyl groups are separated by three to eight carbon atoms and (B) a condensation product of an epoxidized fatty oil and a polyamine having the formula $H_2N(RNH)_xH$ where R is an alkylene radical having from 1 to 8 carbon atoms and $x$ is an integer from 1 to 6, the condensation reaction being carried out at a temperature of 100 to 300° C.

6. Process of condensing an epoxidized fatty oil and an alkylene polyamine comprising heating from 100 to 300° C., an epoxidized fatty oil and an alkylene polyamine having the formula $H_2N(RNH)_xH$ where R is an alkylene radical having from 1 to 8 carbon atoms and $x$ is an integer from 1 to 6.

References Cited in the file of this patent

UNITED STATES PATENTS

| | | |
|---|---|---|
| 2,695,908 | Wittcoff et al. | Nov. 30, 1954 |
| 2,788,287 | Zweig | Apr. 9, 1957 |
| 2,824,848 | Wittcoff | Feb. 25, 1958 |
| 2,839,219 | Groves et al. | June 17, 1958 |
| 2,839,549 | Wilson | June 17, 1958 |
| 2,890,228 | Forster | June 9, 1959 |
| 2,939,853 | Delius | June 7, 1960 |

Notice of Adverse Decision in Interference

In Interference No. 90,204 involving Patent No. 3,035,000, R. W. Fulmer, Condensation products of an epoxidized fatty oil and an alkylene polyamine, final decision adverse to the patentee was rendered Apr. 25, 1963, as to claims 1, 2, 3, 4 and 6.

[*Official Gazette August 20, 1963.*]